March 20, 1951

R. E. MARBURY ET AL 2,546,008

SERIES-CAPACITOR PROTECTIVE SYSTEM

Filed Jan. 13, 1945

WITNESSES:

INVENTORS
Ralph E. Marbury and
James B. Owens.
BY
ATTORNEY

March 20, 1951  R. E. MARBURY ET AL  2,546,008
SERIES-CAPACITOR PROTECTIVE SYSTEM
Filed Jan. 13, 1945  2 Sheets-Sheet 2

WITNESSES:
E.A.M?Closkey.
F. P. Lyle

INVENTORS
Ralph E. Marbury and
James B. Owens.
BY O.B.Buchanan
ATTORNEY

Patented Mar. 20, 1951

2,546,008

UNITED STATES PATENT OFFICE 2,546,008

SERIES-CAPACITOR PROTECTIVE SYSTEM

Ralph E. Marbury, Pittsburgh, and James B. Owens, Wilkinsburg, Pa., assignors to Westinghouse Electric Corporation, East Pittsburgh, Pa., a corporation of Pennsylvania Application January 13, 1945, Serial No. 572,610

12 Claims. (Cl. 175—294)

The present invention relates to the protection of series capacitors, or similar circuit elements, and, more particularly, to a protective system utilizing a thermally actuated protective device for protecting series capacitors against over-voltage.

Capacitors are connected in series in electric transmission or distribution lines in order to neutralize the inductive reactance of the line, and thus to increase the power limits and stability of a transmission line, or to improve the voltage regulation of a distribution line. Capacitors are often connected in series with certain types of electrical equipment, such as welders, which have a rapidly fluctuating power demand, so as to reduce the severity of the voltage fluctuations in the supply system. Since series capacitors carry the line current, the voltage across the capacitor is proportional to the line current, and in case of a fault on the line or an abnormal overload, the voltage across the capacitor may rise to dangerously high values. It is not economically practical to use capacitors which are capable of withstanding continuously the maximum voltage that may occur under fault conditions, since the cost of a capacitor varies approximately as the square of the voltage for which it is insulated, and it is, therefore, necessary to provide some protective means for by-passing the capacitor upon the occurrence of an overvoltage.

Capacitors of the usual type can withstand moderate overvoltages, such as 150% of the normal voltage, for short periods without damage, but they cannot withstand higher overvoltages, such as 250% to 300% of the normal voltage, and the protective means must, therefore, operate to by-pass the capacitor substantially instantaneously upon the occurrence of an overvoltage which is higher than can safely be applied to the capacitor. Because of this requirement of substantially instantaneous operation, it has been customary to utilize spark gaps connected across the capacitor which will break down on the first half-cycle of fault current and thus protect the capacitor.

One type of protective system which has been successfully used comprises a main gap device connected to by-pass the capacitor, and a trigger circuit for initiating breakdown of the main gap, since the main gap must be of a type which is capable of carrying the heavy fault current and which cannot, therefore, readily be calibrated with the required accuracy, especially for voltages as low as a few hundred volts. A contactor coil is connected in series with the main gap so as to be energized by the gap current when the gap operates and thus cause the contactor to close its contacts, which are connected to complete a by-pass circuit around both the gap and the capacitor, thus extinguishing the arc in the gap and protecting the capacitor. The contactor coil is connected so that a portion of the coil remains in the circuit after the contactor closes to function as a holding coil to keep the contactor closed until the line current drops to normal, when the contactor opens to restore the capacitor to service.

Although protective systems of this type are in successful use, they have several disadvantages. When the gap breaks down and by-passes the capacitor, the energy stored in the capacitor discharges through the contactor coil. This discharge has a steep wave front, and it causes high voltages to be built up on the end turns of the coil, which requires special insulation to withstand the high voltage between turns. Since a portion of the contactor coil remains in circuit to function as a holding coil, the design of the coil must be carefully co-ordinated with the system on which it is to be used, in order to obtain proper functioning of the holding coil to keep the contactor closed while fault current is flowing and to permit the contactor to open when the fault is cleared and the current returns to its normal value. This requires a study of the system constants in each case, and frequently makes it necessary to design and manufacture a special coil for each installation. Thus, in this type of protective system, special and relatively expensive contactor coils must be used. Another disadvantage of this type of arrangement is that the heavy surge currents which flow through the contactor coil give the contactor a very high acceleration in closing and thus subject it to large mechanical stresses. Since this type of system has no appreciable time delay, certain conditions, such as a swinging ground fault on the line, may cause the contactor to operate many times in rapid succession. For these reasons, the contactor frequently has a very short life.

Still another disadvantage of this type of protective system is that it offers no protection against a continuous moderate overvoltage on the capacitor which is not high enough to cause operation of the gap but which is dangerous to the capacitor if it is continued over a long enough time. The gap circuit cannot be adjusted to operate at a lower voltage than about 165% of normal voltage without danger of false operation, and it is possible, therefore, for voltages as high as 150% of the normal voltage to exist across the capacitor for sustained periods, with resultant damage to the capacitor.

The principal object of the present invention is to provide an improved protective system for series capacitors which avoids the disadvantages of the prior type of protective system discussed above.

Another object of the invention is to provide a protective system for series capacitors utilizing a thermally-responsive device for actuating switch means for by-passing the capacitor, the thermally-responsive device being heated by, or in response to, the line current so as to cause operation of the switch means in response to excess current.

A more specific object of the invention is to provide a protective system for series capacitors in which the capacitor is by-passed by a switch which is actuated by a thermally-responsive device such as a collapsible bellows. The bellows is preferably made of conducting material and is heated directly by, or in response to, the line current, at least at times of excessive line current. Since such a device inherently has inverse time-delay characteristics, it provides protection against sustained moderate overvoltages as well as against higher overvoltages resulting from fault currents. In order to obtain the necessary rapid operation on fault currents, the system may also include a spark gap to give substantially instantaneous protection upon the occurrence of an overvoltage which is greater than can be permitted across the capacitor even momentarily.

A further object of the invention is to provide a protective device for electrical apparatus consisting of a bellows-actuated switch in which the switch is biased to closed position but is held open by the bellows under normal conditions. The bellows is evacuated and contains a liquid which raises the internal pressure sufficiently to permit the switch to close when the bellows is heated. In this way, failure of the bellows causes immediate closure of the switch, because of the increase in internal pressure, and does not result in leaving the protected apparatus without protection.

The invention will be more fully understood from the following detailed description, taken in connection with the accompanying drawings, in which.

Figures 1, 2:
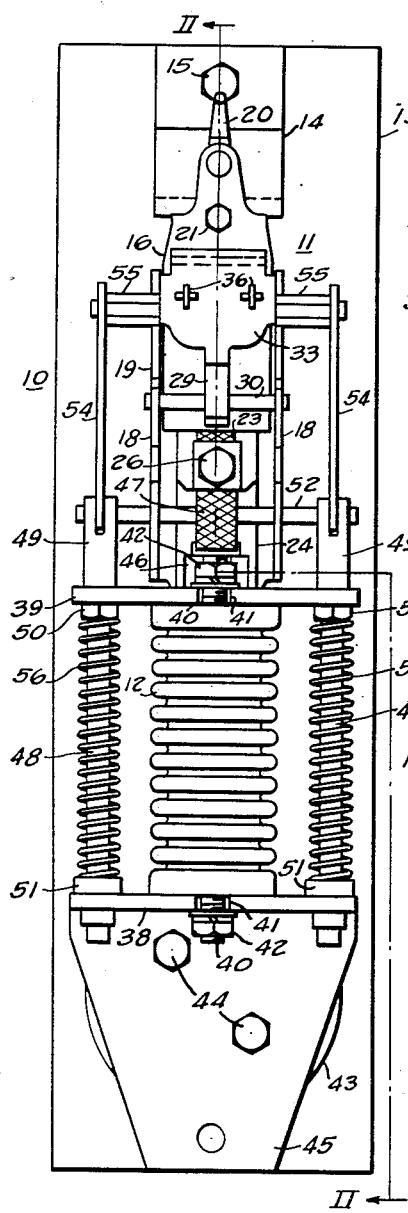
Figure 1 is a plan view of a protective device which forms a part of the new protective system.
Fig. 2 is a side elevation of the protective device, partly in section, on the line II—II of Fig. 1.

As indicated above, the protective system of the present invention utilizes a thermally-actuated protective device which includes switch means for by-passing the series capacitor, or other protected apparatus, and an expansible bellows for controlling the switch means. A preferred embodiment of this device is shown in detail in Figs. 1 and 2 of the drawings. The protective device 10 consists generally of a switch 11 and a bellows 12, mounted on a suitable base 13. The device may be mounted in either a horizontal or vertical position. The switch portion 11 of the protective device 10 may be of any suitable type, and is shown as a switch of the overcenter toggle type. The switch 11 includes a stationary contact member 14, which may be of copper or other suitable conducting material, and which is mounted on the base 13 by means of screws 15. The contact member 14 may also serve as a terminal for the device, an external lead being connected either under the screws 15 or in any other suitable manner. The switch 11 also includes a movable contact arm 16 which is pivoted on a pin 17 extending between the side walls 18 of a frame or body 19. A contact member 20 is pivotally attached to the contact arm 16 by a stud 21, and is held in solid engagement with the stationary contact 14, when the switch is in closed position, by means of a spring 22 at the end of the contact arm 16. The contact member 20 is connected by a flexible conductor 23 to a terminal plate 24 supported in the frame 19. The frame 19, with the terminal plate 24, is supported on an insulator 25 and secured thereto in any suitable manner, as by screws 26.

The switch 11 is actuated by a toggle mechanism which includes a pair of links 27, only one of which is visible in the drawings, pivoted at 28 on opposite sides of a fixed support 29, which is secured by studs 30 between the walls 18 of the frame 19. A link 31 is pivoted at one end between the links 27, and the other end of the link 31 is attached to the contact arm 16 by a pin 32. The switch is operated by means of a spring yoke 33 which is pivoted on pins 34 in the opposite side walls 18 of the frame 19. A pair of springs 35 is secured in the yoke 33, the upper ends of the springs being attached to the top of the yoke at 36, and the lower ends of the springs 35 being attached to the ends of the pin 37 which joins the links 27 and 31. It will be seen that when the switch is in the closed position shown in the drawings, the toggle formed by the links 27 and 31 maintains the contact arm 16 locked in the closed position. When the yoke 33 is moved counterclockwise about its pivot 34, the springs 35 snap over past the center of the toggle, and by pulling on the pin 37, break the toggle and move the contact arm 16 about its pivot 17 to open the switch. Movement of the yoke 33 in the reverse direction closes the switch and reforms the toggle. It will be understood that any suitable type of switch might be used in the protective device 10, and the particular switch construction which has been described in detail is not a part of the invention, as such.

The bellows 12 is attached to and supported by a fixed metal contact plate 38 and a movable metal plate 39. Each end of the bellows 12 has a threaded stud 40 thereon and the studs 40 pass through slots 41 in the plates 38 and 39, the bellows being clamped to the plates by means of nuts 42. This arrangement permits easy removal and replacement of the bellows when necessary merely by loosening the nuts 42 and removing the bellows from the slots 41. A new bellows can then readily be inserted and the nuts tightened.

The stationary contact plate 38 is supported on an insulator 43 by means of screws 44 and has an extending end 45 which serves as a terminal for the device. The plates 38 and 39 are clamped in good electrical contact with the opposite ends of the bellows 12 by the nuts 42, and the movable plate 39 has a terminal block 46 welded or brazed to it. A flexible conductor 47 connects the terminal block 46 to the terminal plate 24 and the movable contact member 20 of the switch 11.

The movable plate 39 is arranged to actuate the switch 11 and for this purpose a pair of elongated studs 48 are secured in the plate 39, one on each side of the bellows 12. Each of the studs 48 extends through the plate 39 and terminates in a square end portion 49 which is rigidly clamped to the plate 39 by means of a nut 50. The opposite ends of the studs 48 extend through holes in the stationary plate 38 and are insulated from the plate 38 by bushings 51 of insulating material in which the studs 48 are slidable. The square ends 49 of the studs 48 are connected by a transverse pin 52 which extends through elongated slots 53 in the side walls 18 of the frame 19 to guide the movement of the studs, and to support the studs and plate 39. The square ends 49 of the studs are slotted and a link 54 is pivoted in the end of each stud on the pin 52. The opposite ends of the links 54 are connected to the sides of the yoke 33 by means of bars 55 which may be welded or brazed to the yoke 33. It will be seen, therefor, that movement of the plate 39 in the direction of the axis of the bellows 12 actuates the switch 11 to open or closed position, the pivotal connection of the links 54 in the slotted ends of the studs 48 permitting arcuate moveemnt of the yoke 33. The plate 39 is normally urged toward the switch 11 to move it to closed position by means of compression springs 56 which surround the studs 43 between the stationary plate 38 and the movable plate 39.

The bellows 12 is evacuated so that under normal conditions, the bellows is collapsed by the external atmospheric pressure and holds the switch 11 in open position against the force of the springs 56. The bellows contains a suitable amount of a liquid which has a very low vapor pressure at the normal temperature, that is, the temperature of the bellows under normal conditions, but which has a vapor pressure at the temperature of the bellows at which it is desired to operate the switch 11 which is high enough to balance the external atmospheric pressure. It has been found, for the range of temperatures involved in the application of this device to series capacitor protection, and for practical designs of the bellows 12, that water is the most suitable liquid for this purpose, although any liquid having the necessary characteristics might be used. The bellows is intended to carry current and to be heated by the passage of current through its walls and it must, therefore, be made of electrically conductive material. It has been found that stainless steel is the most suitable material for the bellows 12, since its electrical resistance is such as to insure sufficient heating of the bellows, and it also has the necessary mechanical properties for reliable operation of the bellows with a reasonable life.

In the operation of the protective device 10, the bellows 12 is connected by means of the terminal plates 24 and 45 to carry current, as described hereinafter. The current, of course, heats the bellows, but the bellows is designed so that under normal current conditions the temperature of the bellows remains in the range where the water with which it is charged has extremely low vapor pressure. Since the bellows is evacuated before being charged with water, the internal pressure is extremely low, and the bellows is collapsed by the external atmospheric pressure. Since one end of the bellows is rigidly attached to the movable plate 39 and the other end is attached to the stationary plate 38, the plate 39 is drawn in the direction away from the switch 11 by the bellows, against the force of the springs 56, and the switch is held in open position. When an abnormally high current occurs, the temperature of the bellows rises and the vapor pressure of the water in it also rises. When the bellows reaches the temperature at which operation of the switch 11 is desired, the vapor pressure of the water inside the bellows balances the external atmospheric pressure, so that the bellows expands and no longer opposes the springs 56, and the springs move the plate 39 to close the switch 11.

It will be observed that the switch is held in open position under normal conditions because of the substantial vacuum in the bellows 12. If any failure of the bellows occurs, permitting air to leak into it, the internal pressure becomes equal to the external pressure and the springs 56 immediately close the switch. This is an important feature of the invention since failure of the bellows results in immediate closing of the switch so that the protected device is not left without protection as would be the case if the switch were operated merely by expansion and contraction of the bellows. It will be understood, however, that if this additional safety feature is not desired, the springs 56 may be omitted and the switch 11 operated directly by expansion of the bellows 12.

In the use of this device for the protection of series capacitors, the switch 11 is connected across the capacitor to complete a by-pass circuit around it, and the bellows 12 is connected, at least under excess-current conditions, to carry the line current so as to be heated by the current. Thus, excessive line current causes operation of the device in the manner described above to close the switch 11 and by-pass the capacitor to protect it from the resultant overvoltage.

Figure 3:
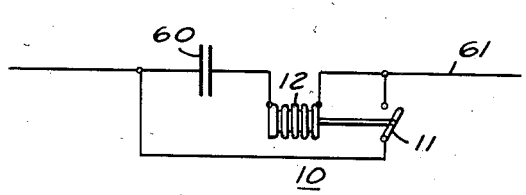
Figs. 3, 4, and 5 are schematic diagrams showing different embodiments of the protective system.

This type of protective system may be applied in two general ways. In cases where a series capacitor is installed in a circuit where the maximum fault current which may occur under the worst possible fault conditions is relatively low, as compared to the normal full-load current, it has been found that inexpensive and reliable protection can be obtained in the manner shown in Fig. 3. In this figure, a capacitor 60 is shown connected in series in a line 61. It will be understood that the line 61 represents one conductor of either a single-phase or a three-phase line or, in general, any electrical conductor in which it is desired to introduce series capacitance. The capacitor 60 in Fig. 3 is designed to withstand the voltage corresponding to the maximum fault current for the short time required for the switch 11 to operate, which is of the order of a few cycles at the maximum fault current. Although this requires the use of a somewhat more expensive capacitor than if the capacitor were required to withstand only the normal voltage, the simplicity and low cost of the protective equipment more than offsets the increased cost of the capacitor. The capacitor 60 is protected by the protective device 10, which is connected, as shown, with the bellows 12 connected directly in series with the line 61 and with the switch 11 connected across the capacitor 60 and bellows 12.

The operation of this embodiment of the invention will be apparent. The bellows 12 is continuously heated by the line current, but under normal conditions, with currents not exceeding the normal full-load current of the line, the temperature of the bellows will be in the range where the vapor pressure within the bellows is very low, and the switch 11 remains open. In case of a fault on the line, the fault current flowing through the bellows 12 rapidly heats it to a high enough temperature to cause operation of the protective device in the manner described above, so that the switch 11 closes to by-pass the capacitor and protect it from the overvoltage. As previously explained, in this embodiment of the invention, the capacitor 60 is designed to withstand the overvoltage for the very short period necessary for the switch 11 to close. When the switch closes, it by-passes both the capacitor and the bellows, so that the bellows does not carry the heavy fault current continuously, which might damage it. The bellows begins to cool as soon as the switch closes, and after a certain time interval, it has cooled enough to cause the switch 11 to open and restore the capacitor to service. In most cases, the overcurrent condition will have passed when the switch opens, but if it still exists, the bellows will again heat up and cause operation of the switch as before to protect the capacitor.

This arrangement also has the advantage of providing protection for the capacitor against sustained moderate overvoltages. Thus, as pointed out above, the capacitor 60 is capable of safely withstanding relatively low overvoltages for reasonable lengths of time, although it can withstand higher overvoltages only for much shorter periods. The bellows 12 inherently has inverse time-delay characteristics, that is, on relatively low overcurrents, its temperature will rise relatively slowly, while on higher currents, its temperature will rise more rapidly, so that the time required for the bellows to reach the temperature at which the protective device operates is an inverse function of the current. By coordinating the design of the bellows with the characteristics of the capacitor, protection against sustained moderate overvoltages is obtained, since if a moderate overcurrent continues for a long enough period to endanger the capacitor, the temperature of the bellows will rise to the point where the switch 11 operates to protect the capacitor. Thus complete protection is provided both against overvoltages caused by heavy fault currents, and against moderate sustained overvoltages which can be permitted for limited times.

In many applications of series capacitors, the maximum fault current is much greater than the normal full-load current and the capacitor cannot economically be designed to withstand the maximum voltage to which it may be subjected, even momentarily. In such cases, the protective system of the present invention may take the form shown in Fig. 4. In this embodiment of the invention, instantaneous protection for the series capacitor 60 is provided by a main spark gap device 62. Any suitable type of spark gap device may be used which will break down substantially instantaneously upon the occurrence of a predetermined overvoltage, and which is capable of discharging the heavy fault current without being damaged. If the normal voltage across the capacitor 60 is relatively high, the gap 62 may be connected directly across the capacitor and calibrated to break down at a predetermined overvoltage. If the normal voltage across the capacitor is relatively low, however, such as a few hundred volts, it is preferred to initiate breakdown of the gap 62 by means of a trigger circuit 63.

Figure 4:
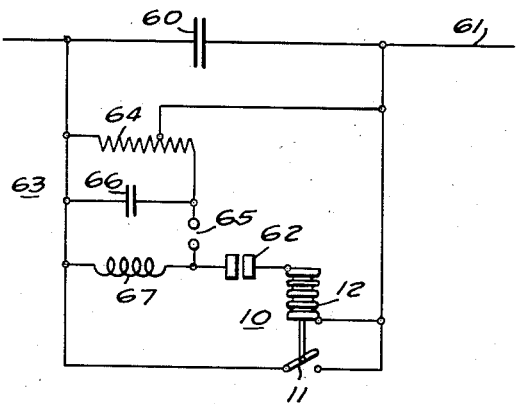

The trigger circuit 63 shown in Fig. 4 is of the type described and claimed in a patent to R. E. Marbury, No. 2,072,717, issued March 2, 1937, and assigned to the Westinghouse Electric & Manufacturing Company. The trigger circuit 63 includes an autotransformer 64 connected across the capacitor 60, and an auxiliary spark gap 65. The autotransformer 64 steps up the voltage across the series capacitor 60 and applies it to the auxiliary spark gap 65, which preferably has metal electrodes so as to be capable of very accurate calibration, and which is adjusted to break down at a voltage corresponding to the maximum voltage which can be permitted to appear across the capacitor 60. When the gap 65 breaks down, the small auxiliary capacitor 66, which is connected across the autotransformer 64, discharges through the gap 65 and an air-core inductance 67. The capacitor 66 and inductance 67 form an oscillatory circuit which is designed to have a very high natural frequency, and the high-voltage, high-frequency oscillations in this circuit are impressed across the main gap 62 through the series capacitor 60, which has negligible impedance at the high frequency, thus causing the gap 62 to break down and by-pass the capacitor 60. The main gap 62 preferably has massive carbon electrodes to enable it to discharge the heavy fault currents without damage, and since breakdown of the gap is effected by the trigger circuit 63, the gap 62 does not have to be capable of accurate calibration.

The protective device 10 is connected to by-pass both the gap 62 and the capacitor 60 after operation of the gap 62, so as to extinguish the arc in the gap and to protect the capacitor. For this purpose, the bellows 12 is connected in series with the gap 62 so that it is heated by the gap current flowing through the bellows. The switch 11 is connected, as shown, to by-pass both the gap and the capacitor. In operation, if a fault occurs on the line, or if the voltage across the capacitor 60 exceeds the value for which the auxiliary gap 65 is calibrated, the trigger circuit functions to cause the main gap 62 to commence discharging substantially simultaneously with the occurrence of the overvoltage, thus by-passing the capacitor 60 and protecting it. The gap current flows through the bellows 12, which is in series with the gap, and rapidly heats the bellows to the temperature at which the switch 11 is closed. When the switch closes, it completes a circuit to by-pass both the capacitor and the gap, thus protecting the series capacitor 60 and extinguishing the arc in the gap 62. As soon as the switch 11 closes and the arc in the gap 62 is extinguished, current flow in the bellows 12 ceases, and it commences to cool. After a more or less definite time interval, which is made long enough to permit the protective devices of the line to clear the fault, the bellows has cooled sufficiently to open the switch 11 and the capacitor is restored to service. If for any reason the overvoltage still exists at this time, the gap 62 again breaks down and the operation is repeated. Thus, the series capacitor 60 is fully protected against overvoltages resulting from faults on the line.

Figure 5:
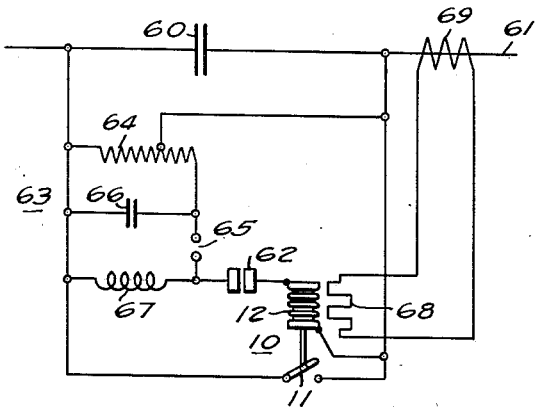

The embodiment of the invention shown in Fig. 4 does not provide protection against moderate or low overvoltages which are not high enough to cause operation of the gap 62 but which may be dangerous to the capacitor 60 if they persist for a sufficiently long period. Such protection can be obtained by the means shown in Fig. 5. The circuit shown in this figure is identical to that of Fig. 4 with the addition of a heater coil 68 placed adjacent the bellows 12 to heat it. The coil 68 is energized in accordance with the line current by means of a current transformer 69 connected in the line, so that the bellows 12 is continuously heated by the heater 68, the amount of heating being dependent upon the magnitude of the line current. The bellows 12 and heater 68 are so designed that under normal line current conditions, the temperature of the bellows does not rise high enough to cause operation of the switch 11. In case of excess current, however, the temperature of the bellows rises, the rate of rise of the temperature depending on the magnitude of the current, and if the overcurrent continues for a sufficiently long time, the bellows will cause the switch 11 to operate to by-pass the capacitor 60 and thus protect it against the overvoltage. Because of the inverse time-delay characteristics of the bellows 12, it will cause the switch to operate within a relatively short time in response to high overcurrents while a longer time is required if the overcurrent is lower. In this way, protection against moderate overvoltages is provided but the capacitor is not removed from service unless the overvoltage persists for a long enough time to make it necessary. In case of occurrence of a voltage which cannot be permitted across the capacitor even momentarily, the gap 62 breaks down to protect the capacitor and the operation is the same as described above in connection with Fig. 4.

It should now be apparent that a protective system has been provided for series capacitors which provides complete and adequate protection both against high overvoltages, which cannot be permited across the capacitor even momentarily, and against lower overvoltages, which the capacitor can safely withstand for short periods. The new system avoids the disadvantages of the systems previously used, since it does not require any contactor coil and is, therefore, not subject to the disadvantage of requiring a special design for each installation. The new protective system utilizes only a relatively simple protective device comprising a switch and an expansible bellows for effecting operation of the switch, the bellows being heated directly by, or in response to, the line current. An important feature of the invention is the construction of this device which is so arranged that in case of failure of the bellows the switch will immediately close, thus giving an indication of the condition, and insuring that the capacitor is not left without protection until a new bellows can be inserted.

It is to be understood that although certain specific embodiments of the invention have been described for the purpose of illustration, various other modifications and embodiments are possible within the scope of the invention. It is also to be understood that although the invention has been described with reference to the protection of series capacitors, it is also applicable to the protection of other types of electrical apparatus which it may be desirable to by-pass upon the occurrence of excess currents, and that the protective device itself is not limited in its application to the arrangements described, but may be used in various other ways for the protection of electrical apparatus. The invention is not limited, therefore, to the particular embodiments described, but in its broadest aspects, it includes all equivalent embodiments and modifications which come within the scope of the appended claims.

We claim as our invention:

1. An overvoltage protective system for a series capacitor connected in series in an electric transmission or distribution line, said protective system comprising an expansible bellows of conductive material, means for electrically connecting said bellows, at least at times of excessive line current, to carry the line current and be heated thereby, switch means for completing a by-pass circuit around said series capacitor and bellows, spring means tending to move said switch means to circuit-completing position, said bellows being attached to the switch means and being adapted to hold the switch means in open-circuit position under normal conditions, and said bellows being adapted to expand when heated above a predetermined temperature to permit the switch means to be moved to circuit-completing position by said spring means.

2. An overvoltage protective system for a series capacitor connected in series in an electric transmission or distribution line, said protectve system comprising an expansible bellows of conductive material, means for electrically connecting said bellows, at least at times of excessive line current, to carry the line current and be heated thereby, switch means for completing a by-pass circuit around said series capacitor and bellows, spring means tending to move said switch means to circuit-completing position, said bellows being substantially evacuated and containing a liquid which has a very low vapor pressure at normal temperatures of the bellows and which has a high enough vapor pressure at the desired operating temperature to balance the atmospheric pressure on the bellows, the bellows being attached to the switch means to hold it in open-circuit position under normal conditions when the bellows is collapsed by atmospheric pressure and to permit the switch means to be moved to circuit-completing position by said spring means when the internal pressure in the bellows balances the atmospheric pressure and expands the bellows.

3. An overvoltage protective system for a series capacitor connected in series in an electric transmission or distribution line, said protective system comprising gap means adapted to break down and by-pass said series capacitor upon the occurrence of a predetermined overvoltage across the capacitor, an expansible bellows of conductive material electrically connected in series with the gap means to carry the gap current and be heated thereby, and switch means connected to complete a by-pass circuit around the series capacitor and the gap means, said switch means being actuated to circuit-completing position in response to expansion of said bellows when it is heated to a predetermined temperature, and means for continuously heating the bellows in accordance with the line current, whereby the bellows effects operation of the switch means to complete the by-pass circuit when the bellows reaches the predetermined temperature as a result of an excess current in the line which is not great enough to cause operation of the gap means.

4. An overvoltage protective system for a series capacitor connected in series in an electric transmission or distribution line, said protective system comprising gap means adapted to break down and by-pass said series capacitor upon the occurrence of a predetermined overvoltage across the capacitor, an expansible bellows of conductive material electrically connected in series with the gap means to carry the gap current and be heated thereby, switch means connected to complete a by-pass circuit around the series capacitor and the gap means, said switch means being actuated to circuit-completing position in response to expansion of said bellows when it is heated to a predetermined temperature, a heater for heating the bellows, and means for continuously energizing the heater in accordance with the line current, whereby the bellows effects operation of the switch means to complete the by-pass circuit when the bellows reaches the predetermined temperature as a result of an excess current in the line which is not great enough to cause operation of the gap means.

5. A protective system for a capacitor connected in series in an alternating current line, said protective system comprising an electrically conductive expansible bellows device adapted to carry the line current and to be heated solely thereby, means for electrically connecting said bellows device, at least at times of excessive current, to carry the line current, and switch means connected to complete a by-pass circuit around the capacitor and the bellows device, the bellows device being adapted to expand and actuate said switch means to closed position in response to heating of the bellows device above a predetermined temperature.

6. A protective system for a capacitor connected in series in an alternating current line, said protective system comprising an electrically conductive expansible bellows device adapted to carry the line current and to be heated solely thereby, said bellows device being substantially evacuated so as to be collapsed by atmospheric pressure under normal conditions, and the bellows device containing a vaporizable liquid which has high enough vapor pressure at a predetermined temperature of the bellows device to expand the bellows, means for electrically connecting said bellows device, at least at times of excessive current, to carry the line current, switch means connected to complete a by-pass circuit around the capacitor and the bellows device, and means for effecting actuation of said switch means to closed position when the bellows devices is expanded as a result of being heated by the line current above said temperature.

7. A protective system for a capacitor connected in series in an alternating current line, said protective system comprising an electrically conductive expansible bellows device adapted to carry the line current and to be heated solely thereby, said bellows device being substantially evacuated so as to be collapsed by atmospheric pressure under normal conditions, and the bellows device containing a vaporizable liquid which has high enough vapor pressure at a predetermined temperature of the bellows device to expand the bellows, means for electrically connecting said bellows device, at least at times of excessive current, to carry the line current, switch means connected to complete a by-pass circuit around the capacitor and the bellows device, and means for connecting the bellows device to said switch means to effect actuation of the switch means to closed position when the bellows device is expanded as a result of being heated by the line current above said temperature.

8. A protective system for a capacitor connected in series in an alternting current line, said protective system comprising an electrically conductive expansible bellows device adapted to carry the line current and to be heated thereby, means for electrically connecting said bellows device to carry the line current continuously and to be heated solely thereby, and switch means connected to complete a by-pass circuit around the capacitor and the bellows device, the bellows device being adapted to expand and effect actuation of said switch means to closed position in response to heating of the bellows device above a predetermined temperature.

9. A protective system for a capacitor connected in series in an alternating current line, said protective system comprising an electrically conductive expansible bellows device adapted to carry the line current and to be heated thereby, means for electrically connecting said bellows device in series in the line to carry the line current continuously and to be heated solely thereby, switch means connected to complete a by-pass circuit around the capacitor and the bellows device, and means for connecting the bellows device to said switch means to effect actuation of the switch means to closed position when the bellows device is expanded as a result of heating by the line current above a predetermined temperature.

10. A protective system for a capacitor connected in series in an alternating current line, said protective system comprising gap means adapted to break down and by-pass the capacitor upon the occurrence of a predetermined overvoltage across the capacitor, an electrically conductive thermally-responsive device adapted to carry the gap current, means for connecting said thermally-responsive device in series with the gap means to carry the gap current and to be heated solely thereby, and switch means connected to complete a by-pass circuit around the capacitor, the gap means and the thermally-responsive device, the thermally-responsive device being adapted to effect actuation of said switch means to closed position in response to heating of the thermally-responsive device by the gap current.

11. A protective system for a capacitor connected in series in an alternating current line, said protective system comprising gap means adapted to break down and by-pass the capacitor upon the occurrence of a predetermined overvoltage across the capacitor, an electrically conductive expansible bellows device adapted to carry the gap current, means for connecting said bellows device in series with the gap means to carry the gap current and to be heated solely thereby, and switch means connected to complete a by-pass circuit around the capacitor, the gap means and the bellows device, the bellows device being adapted to expand and effect actuation of said switch means to closed position in response to heating of the bellows device by the gap current.

12. A protective system for a capacitor connected in series in an alternating current line, said protective system comprising gap means adapted to break down and by-pass the capacitor upon the occurrence of a predetermined overvoltage across the capacitor, an electrically conductive expansible bellows device adapted to carry the gap current, said bellows device being substantially evacuated so as to be collapsed by atmospheric pressure under normal conditions, the bellows device containing a vaporizable liquid which has high enough vapor pressure at a predetermined temperature of the bellows device to expand the bellows, means for connecting said bellows device in series with the gap means to carry the gap current and to be heated solely thereby, switch means connected to complete a by-pass circuit around the capacitor, the gap means and the bellows device, and means for connecting the bellows device to said switch means to effect actuation of the switch means to closed position when the bellows device is expanded as a result of heating by the gap current.

RALPH E. MARBURY.
JAMES B. OWENS.

REFERENCES CITED

The following references are of record in the file of this patent:

UNITED STATES PATENTS

| Number | Name | Date |
|---|---|---|
| 283,492 | Kinsman | Aug. 21, 1883 |
| 1,547,632 | Wensley | July 28, 1925 |
| 1,718,980 | Ringwold | July 2, 1929 |
| 1,731,685 | Reyman | Oct. 15, 1929 |
| 1,973,538 | Moffett | Sept. 11, 1934 |
| 2,072,717 | Marbury | Mar. 2, 1937 |
| 2,073,286 | Raney | Mar. 9, 1937 |
| 2,157,886 | Cuttino | May 9, 1939 |
| 2,162,488 | Marbury | June 13, 1939 |
| 2,228,956 | Helland | Jan. 14, 1941 |
| 2,248,608 | Camilli | July 8, 1941 |
| 2,284,876 | Marbury | June 2, 1942 |
| 2,307,598 | Marbury | Jan. 5, 1943 |
| 2,323,720 | Marbury et al. | July 6, 1943 |
| 2,401,009 | Marbury | May 28, 1946 |

FOREIGN PATENTS

| Number | Country | Date |
|---|---|---|
| 314,370 | Germany | Sept. 10, 1919 |
| 213,121 | Switzerland | Apr. 16, 1941 |